United States Patent
Li et al.

(10) Patent No.: US 9,728,970 B2
(45) Date of Patent: Aug. 8, 2017

(54) FEEDFORWARD VOLTAGE SERIES COMPENSATOR BASED ON COMPLEMENTARY USE OF WIND POWER AND PHOTOVOLTAIC POWER

(71) Applicant: Shanghai Jiao Tong University, Shanghai (CN)

(72) Inventors: Guojie Li, Shanghai (CN); Xiuchen Jiang, Shanghai (CN); Bei Han, Shanghai (CN); Keyou Wang, Shanghai (CN); Lin Feng, Shanghai (CN); Lijun Hang, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 408 days.

(21) Appl. No.: 14/583,041

(22) Filed: Dec. 24, 2014

(65) Prior Publication Data

US 2015/0244174 A1    Aug. 27, 2015

(30) Foreign Application Priority Data

Feb. 26, 2014  (CN) .......................... 2014 1 0065315

(51) Int. Cl.
*H02J 5/00* (2016.01)
*H02J 3/24* (2006.01)
*H02J 3/38* (2006.01)

(52) U.S. Cl.
CPC ............... *H02J 3/24* (2013.01); *H02J 3/383* (2013.01); *H02J 3/386* (2013.01); *Y02E 10/563* (2013.01); *Y02E 10/763* (2013.01); *Y10T 307/511* (2015.04)

(58) Field of Classification Search
CPC ... H02J 3/24; H02J 3/383; H02J 3/386; Y02E 10/563; Y02E 10/763; Y10T 307/511
USPC .......................................................... 307/45
See application file for complete search history.

(56) References Cited

U.S. PATENT DOCUMENTS

2013/0099565 A1* 4/2013 Sachs ........................ H02J 3/46
307/25

* cited by examiner

*Primary Examiner* — Rexford Barnie
*Assistant Examiner* — Toan Vu
(74) *Attorney, Agent, or Firm* — Mei & Mark LLP; Manni Li

(57) ABSTRACT

A feedforward voltage series compensator based on complimentary use of wind, solar, and electric power comprising a controller, a rectifier unit, an H bridge inverter, a series transformer, a wind-power DC voltage sensor, a wind-power DC current sensor, an AC voltage transducer, a DC boost unit, a PV DC voltage sensor, a PV DC current sensor, and a grid-connected inverter. The compensator makes use of wind-electric and photovoltaic-electric complimentary interactions to solve the traditional energy issue for series compensator, and as the grid-connected inverter is feedforward, there is extra capacity for the series transformer and the series complimentary inverter unit, and hence it enjoys the feedforward and quick voltage complimentary characteristics of the wind and solar power generation.

3 Claims, 3 Drawing Sheets

FEEDFORWARD VOLTAGE SERIES COMPENSATOR BASED ON COMPLEMENTARY USE OF WIND POWER AND PHOTOVOLTAIC POWER

CROSS-REFERENCE TO RELATED APPLICATIONS

The subject application claims priority on Chinese Patent Application No. CN201410065315.4 filed on Feb. 26, 2014. The contents and subject matter of the Chinese priority application are incorporated herein by reference.

FIELD OF THE INVENTION

The present invention relates to electric power quality control, particularly, a feedforward voltage series compensator based on complimentary use of wind, solar, and electric power.

BACKGROUND OF THE INVENTION

Developed countries have stringent requirement on the power quality. Power quality issues result in huge economic losses for the industries, such as operation shutdown and increased costs for restarting, damage to sensitive equipment, product rejection, and reduction in product quality, which lead to sale difficulty, damage of company image and commercial relations with customers. In addition, they damage equipment of important users, such as medical institutions, resulting in serious operational accidents. A report by the Electric Power Research Institute in the United States shows that power quality issues cause loss up to 30 billion U.S. dollars in data, materials, and productivity to American industries each year (Electric Power Research Institute, 1999). Other developed countries, such as Japan, also have high standard for the power quality. With quick development of the high-tech industries, China is also imposing higher requirement for the power quality. The voltage sag (or collapse, dips) is a major issue that jeopardizes the security of power-using equipment in addition to causing voltage quality issues. Failure of power systems, starting-up of large generators, and short-circuit of a branch circuit all contribute to the voltage sag. The time of the voltage sag is transient, but it causes disruption and shutdown of industrial operation, and the disruption and shutdown time far exceeds the time of the voltage sag, therefore, the damage is huge.

Traditional methods such as voltage adjustors do not solve the problem. Although uninterruptible power supply (UPS) devices do solve the problem, the cost and operational expenditure are high. To solve the problem, research has been carried out both in China and abroad on dynamic voltage compensators. Compared with the UPS, dynamic voltage compensators effectively solve the problem of the voltage sag. However, energy storage still remains a plaguing issue for dynamic voltage compensators. Although advanced methods, such as minimum energy injection, have been proposed, extra energy storage has been affecting their popularization and development.

SUMMARY OF THE INVENTION

The present invention provides a feedforward voltage series compensator based on the complimentary use of the wind, solar, and electric power. It makes full use of the wind and solar power. When the power grid is in normal operation, it transforms the green energy to electric energy and supplies it into the power grid. When the power grid is in failure state, it outputs a corresponding amount of energy to compensate for the difference of the voltage so as to guarantee that the load voltage remains stable and therefore, the load is protected.

The present invention provides a feedforward voltage series compensator based on complimentary use of wind, solar, and electric power, comprising a controller having a rectification control terminal, an H bridge inverter control terminal, a DC voltage boost control terminal, an input terminal for input signals of rotational speed and rotor angle, a PV DC voltage input terminal, a PV DC current input terminal, a grid-connected inverter control terminal, a wind-power DC voltage input terminal, a wind-power DC current input terminal, and an AC voltage input terminal;

a rectifier unit having a control terminal, an AC input terminal, and a DC output terminal;

an H bridge inverter unit having a control terminal, a DC bus terminal, and an AC output terminal;

a series transformer having a primary coil with two ends and a secondary coil;

a wind-power DC voltage sensor having an input terminal and an output terminal;

a wind-power DC current sensor having an input terminal and an output terminal;

an AC voltage transducer having an input terminal and an output terminal;

a DC voltage boost unit having a control terminal, a DC input terminal, and a DC output terminal;

a PV DC voltage sensor having an output terminal and an input terminal;

a PV DC current sensor having an output terminal and an input terminal; and a grid-connected inverter having a control terminal, a DC bus terminal, and an AC output terminal.

In the feedforward voltage series compensator of the present invention, the rectification control terminal of the controller is connected with the control terminal of the corresponding rectifier unit, the H bridge inverter control terminal of the controller is connected with the control terminal of the corresponding H bridge inverter unit, the DC voltage boost control terminal of the controller is connected with the control terminal of the corresponding DC voltage boost unit, the input terminal for input signals of rotational speed and rotor angle of the controller is connected with an output terminal of the rotor position encoder of a wind power synchronous generator, the PV DC voltage input terminal of the controller is connected with the output terminal of the PV DC voltage sensor, the PV DC current input terminal of the controller is connected with the output terminal of the PV DC current sensor, the grid-connected inverter control terminal of the controller is connected with the control terminal of the grid-connected inverter, the AC input terminal of the rectifier unit is connected with an output terminal of a wind power synchronous generator stator, the DC output terminal of the rectifier unit is connected with the DC output terminal of the DC voltage boost unit, and subsequent to connection with the DC output terminal of the DC voltage boost unit, is connected with the DC bus terminal of the H bridge inverter unit, the AC output terminal of the H bridge inverter unit is connected with the two ends of the primary coil of the series transformer, the secondary coil of the series transformer is connected in series to a transmission line of a power grid, and is respectively connected with a supply terminal and a load terminal of the power grid, the input terminal of the wind-power DC voltage sensor is connected with the DC output terminal of the rectifier unit, the output terminal of the wind-power DC voltage sensor is connected with the wind-power DC voltage input terminal of the corresponding controller, the input terminal of the wind-power DC current sensor is connected with the DC output terminal of the rectifier unit, the output terminal of the wind-power DC current sensor is connected with the wind-power DC current input terminal of the corresponding controller, the input terminal of the AC voltage transducer is voltage connected with a node of the power grid, the output terminal of the AC voltage transducer is connected with the AC voltage input terminal of the controller, the DC input terminal of the DC voltage boost unit is connected with an output terminal of a PV cell panel; the input terminal of the PV DC voltage sensor is connected with the DC output terminal of the DC voltage boost unit, the output terminal of the PV DC voltage sensor is connected with the PV DC voltage input terminal of the corresponding controller; the input terminal of the PV DC current sensor is connected in series with the DC output terminal of the DC voltage boost unit, the output terminal of the PV DC current sensor is connected with the PV DC current input terminal of the corresponding controller, the DC bus terminal of the grid-connected inverter is connected with the DC bus terminal of the H bridge inverter unit, the AC output terminal of the grid-connected inverter is voltage parallel connected with the node of the power grid, and the control terminal of the grid-connected inverter is connected with the grid-connected inverter control terminal of the corresponding controller.

The controller is implemented via central processing units, with core parts thereof being digital signal processors, MCUs, or computers.

The present invention further provides a method for series compensation employing the feedforward voltage series compensator based on complimentary use of wind, solar, and electric power comprises the following steps:

1) measuring, by the controller, an AC supply voltage $U_S$, a DC output voltage $U_w$ and a DC output current $I_w$ of the rectifier unit, a DC voltage $U_{PV}$ and a DC current $I_{PV}$ of the DC voltage boost unit, and the rotational speed and the rotator angle of the synchronous generator;

2) computing an output active power $P_w$: $P_w = U_w \times I_w$ of the rectifier unit;

3) computing an output active power $P_{PV}$: $P_{PV} = U_{PV} \times I_{PV}$ of the DC voltage boost unit;

4) controlling, by the controller, complimentary wind, photovoltaic and electric compensation output for the rectifier unit and the DC voltage boost unit:

tracking maximum power of wind power: checking a current value of the output active power $P_w$ of the rectifier unit, increasing the rotational speed of the synchronous generator if the current value of the output active power $P_w$ of the rectifier unit is greater than a previous value of $P_w$, and otherwise maintaining the rotational speed of the synchronous generator unchanged;

tracking maximum power of photovoltaic power: checking a current value of the output active power $P_{PV}$, increasing a duty cycle if the current value of the output active power $P_{PV}$ is greater than a previous value of $P_{PV}$, and otherwise maintaining the duty cycle unchanged;

5) letting $U_{S0}$ be an AC supply voltage value in a normal condition:

if the power grid is in the normal condition, that is, the AC supply voltage $U_S$ is equal to or greater than 90% of the AC supply voltage value $U_{S0}$ in the normal condition, controlling an output voltage of the H bridge inverter unit to be zero, enabling a voltage of the series transformer going into a supply AC transmission line to be zero, and controlling the grid-connected inverter to supply and back-feed wind power and photovoltaic power to the power grid;

if the power grid is in a failure state, that is, the AC supply voltage $U_S$ is less than 90% of the AC supply voltage value $U_{S0}$ in the normal condition, controlling the H bridge inverter unit, so that the output voltage of the H bridge inverter unit satisfies: $U_j = (U_{S0} - U_S)$, and controlling the grid-connected inverter to supply an extra wind power and photovoltaic power to the power grid, and if the wind power and photovoltaic power is not sufficient, supplying power to the DC bus via the grid-connected inverter for maintaining the voltage of the DC bus to be stable.

Compared with technology of prior art, the present invention has the following characteristics:

1. Voltage is outputted in series in case of a voltage sag, and therefore important loads are protected;

2. Series transformers are adopted, and the inverter therefore is adaptive to a wide range of voltage;

3. By making use of complimentary compensation of wind power and solar power, compensation issue of energy storage under voltage sag of a power grid is solved;

4. The grid-connected inverter is feedforward, and no extra capacity is added for the series transformer and the series compensation inverter unit.

DETAILED DESCRIPTION OF THE INVENTION

With references to drawings and embodiments provided hereinafter in a non-limiting way, the present invention will be further expounded.

Figure 1:
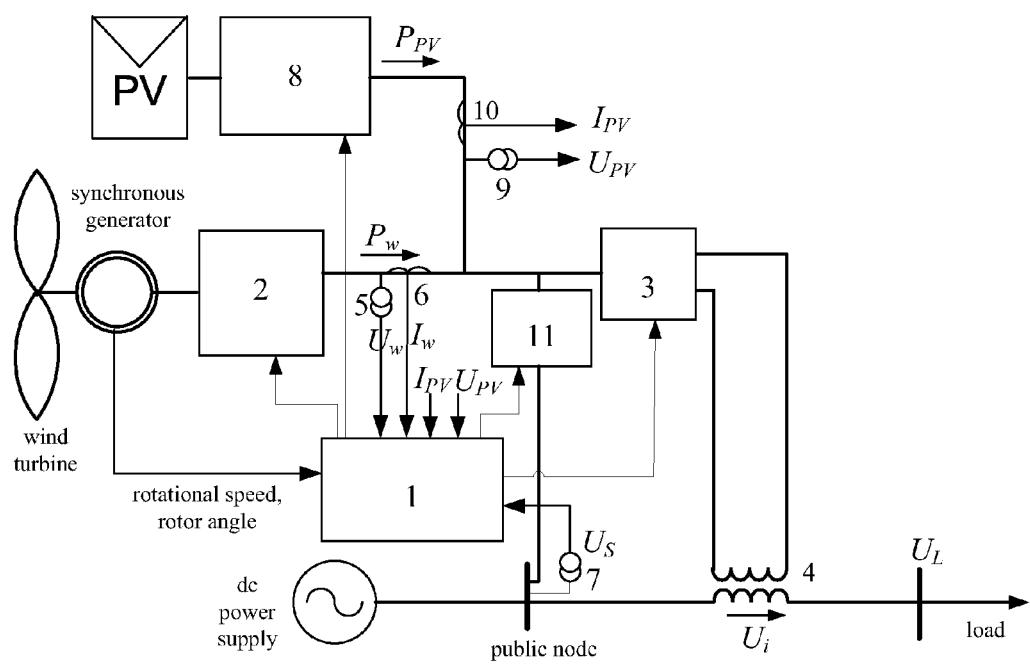
FIG. 1 is a schematic diagram of the structure of the feedforward voltage series compensator based on complimentary wind, photovoltaic and electric compensation of the present invention.

Refer to FIG. 1, a schematic diagram of the structure of the feedforward voltage series compensator based on complimentary wind, photovoltaic and electric compensation of the present invention. As can be seen, it is a feedforward voltage series compensator based on complimentary wind, photovoltaic and electric compensation, comprising: a controller 1, a rectifier unit 2, an H bridge inverter unit 3, a series transformer 4, a wind-power DC voltage sensor 5, a wind-power DC current sensor 6, an AC voltage transducer 7, a DC voltage boost unit 8, a PV (photovoltaic) DC voltage sensor 9, a PV DC current sensor 10, and a grid-connected inverter 11.

The connections among the above components are as follows:

A rectification control terminal of the controller 1 is connected with a corresponding control terminal of the rectifier unit 2, an H bridge inverter control terminal of the controller 1 is connected with a corresponding control terminal of the H bridge inverter unit 3, a DC voltage boost control terminal of the controller 1 is connected with a corresponding control terminal of the DC voltage boost unit 8; an input terminal for input signals of rotational speed and rotor angle of the controller 1 is connected with an output terminal of a tachometric code disc of a synchronous generator, a PV DC voltage input terminal of the controller 1 is connected with an output terminal of the PV DC voltage sensor 9, a PV DC current input terminal of the controller 1 is connected with an output terminal of the PV DC current sensor 10, a grid-connected inverter control terminal of the controller 1 is connected with a control terminal of the grid-connected inverter 11.

An AC input terminal of the rectifier unit 2 is connected with an output terminal of the synchronous generator, a DC output terminal of the rectifier unit 2 is connected with a DC output terminal of the DC voltage boost unit 8.

The DC output terminal of the rectifier unit 2, subsequent to its connection with the DC output terminal of the DC voltage boost unit 8, is connected with a DC bus terminal of the H bridge inverter unit 3, an AC output terminal of the H bridge inverter unit 3 is connected with two ends of a primary coil of the series transformer 4.

A secondary coil of the series transformer 4 is connected in series to a transmission line of a power grid, and is respectively connected with a supply terminal and a load terminal of the power grid.

An input terminal of the wind-power DC voltage sensor 5 is connected with the DC output terminal of the rectifier unit 2, an output terminal of the wind-power DC voltage sensor 5 is connected with a corresponding wind-power DC voltage input terminal of the controller 1.

An input terminal of the wind-power DC current sensor 6 is connected with the DC output terminal of the rectifier unit 2, and an output terminal thereof is connected with a corresponding wind-power DC current input terminal of the controller 1.

An input terminal of the AC voltage transducer 7 is voltage connected with a node of the power grid, and an output terminal thereof is connected with an AC voltage input terminal of the controller 1.

A DC input terminal of the DC voltage boost unit 8 is connected with an output terminal of a PV cell panel.

An input terminal of the PV DC voltage sensor 9 is connected with the DC output terminal of the DC voltage boost unit 8, and the output terminal thereof is connected with a corresponding PV DC voltage input terminal of the controller 1.

An input terminal of the PV DC current sensor 10 is connected in series with the DC output terminal of the DC voltage boost unit 8, and the output terminal thereof is connected with a corresponding PV DC current input terminal of the controller 1.

A DC bus terminal of the grid-connected inverter 11 is connected with the DC bus terminal of the H bridge inverter unit 3, an AC output terminal thereof is voltage parallel connected with the node of the power grid, and the control terminal thereof is connected with a corresponding grid-connected inverter control terminal of the controller 1.

Specific implementations are carried out as described below.

The controller 1 controls the rectifier unit 2 to track maximum power of wind-power, and transforms output AC power of the synchronous generator to DC power. The controller 1 controls the DC voltage boost unit 8 to track maximum power of photovoltaic power, and boosts output photovoltaic DC power to DC power. The output terminal of the rectifier unit 2 is connected with the output terminal of the DC voltage boost unit 8 and the DC bus of the H bridge inverter unit 3 and of the grid-connected inverter 11. The AC output terminal of the H bridge inverter unit 3 is connected with the two ends of the primary coil of the series transformer 4. The secondary coil of the series transformer 4 is connected in series to the transmission line of the power grid, and is respectively connected with the supply terminal and the load terminal of the power grid. The AC output terminal of the grid-connected inverter 11 is connected with the power grid. The DC voltage input terminal of the controller 1 is respectively connected with the output terminal of the wind-power DC voltage sensor 5 and of the PV DC voltage sensor 9. The DC current input terminal of the controller 1 is respectively connected to the output terminals of the wind-power DC current sensor 6 and of the PV DC current sensor 10, and output DC voltage and DC current of the rectifier unit 2 is respectively measured via the DC voltage sensor 5 and the DC current sensor 6. Output DC voltage and DC current of the DC voltage boost unit 8 is respectively measured via the DC voltage sensor 9 and the DC current sensor 10. The AC voltage input terminal of the controller is connected with the AC voltage transducer 7, and the supply voltage of the power grid is measured via the AC voltage transducer 7.

In a normal condition of the power grid, the controller 1 controls the H bridge inverter unit 3 to enable the output DC voltage thereof to be zero, and injects wind power and photovoltaic power into the power grid via controlling the grid-connected inverter 11. When the voltage of the power grid is less than 90% of the normal voltage, the H bridge inverter is controlled to conduct voltage series compensation and to inject extra wind power and photovoltaic power into the power grid. And if the wind power or the photovoltaic power is not sufficient, power is fed back to the DC bus via the power grid to maintain the voltage of the DC bus to be constant.

Figure 2:
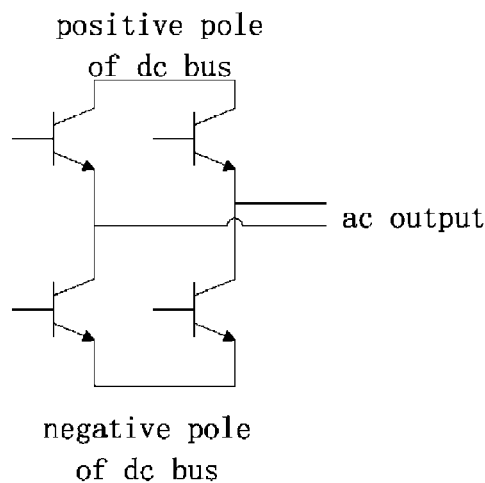
FIG. 2 is a topological diagram of one phase of the H bridge inverter unit of the present invention.
Figure 3:
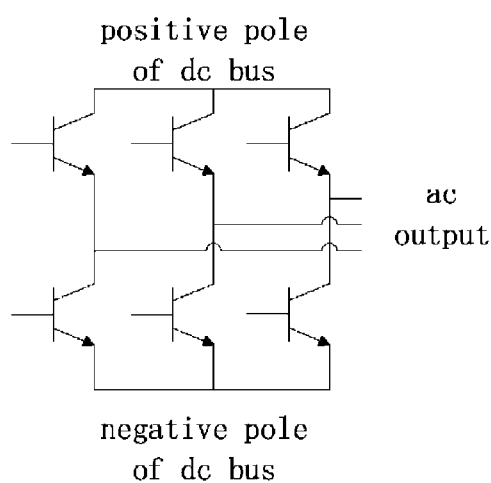
FIG. 3 is a topological diagram of the grid-connected inverter of the present invention.
Figure 4:
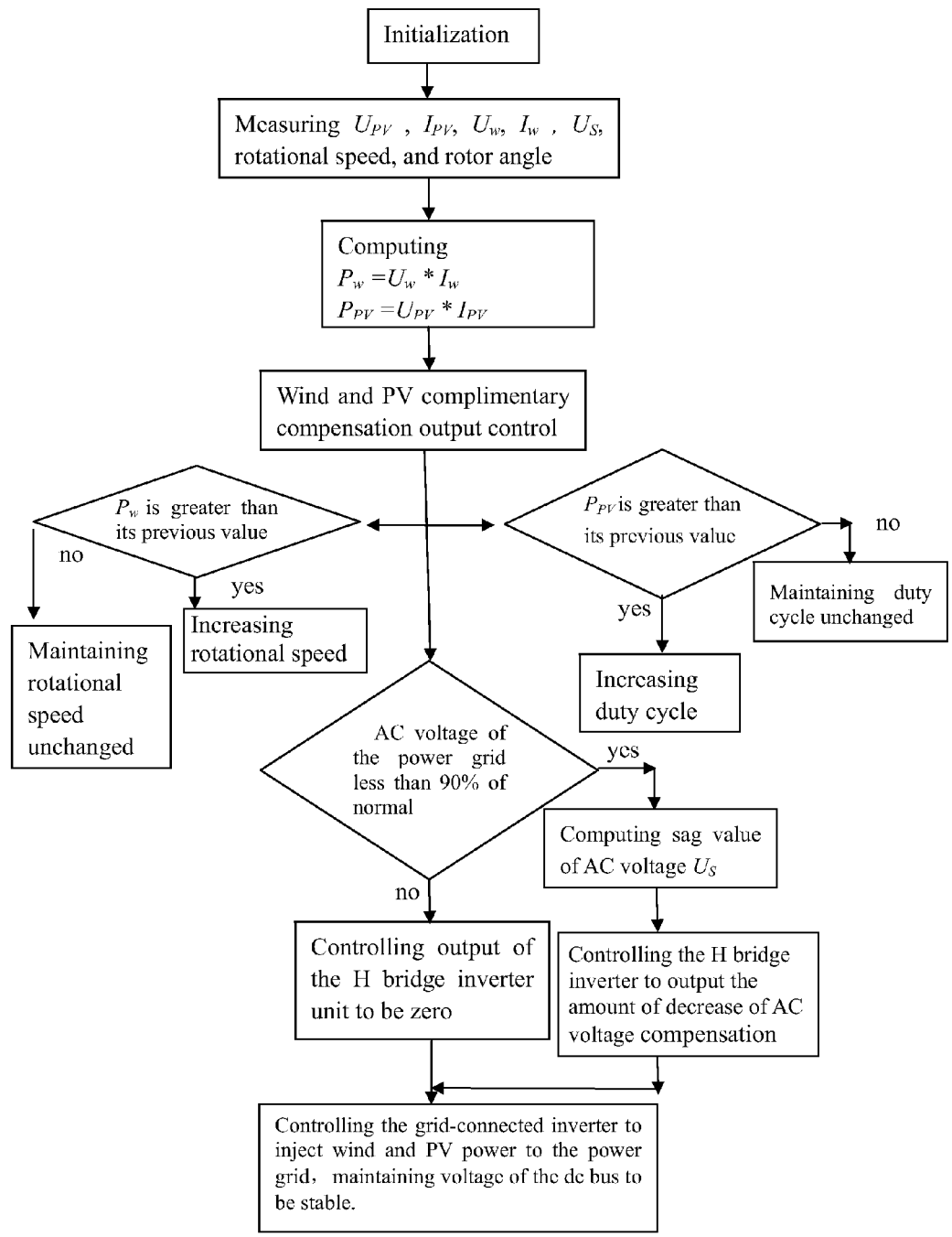
FIG. 4 is a control flow chart for the series compensation of the present invention.

FIG. 2 is a topological diagram of single phase H bridge, the structure of the three phase case being the same. FIG. 3 is a topological diagram of the three-phase grid-connected inverter in two inverter levels. FIG. 4 is a flow chart for the method of series compensation control, maximum power of wind power and photovoltaic power generation is tracked and controlled by computing output power $P_w$ and $P_{PV}$ of the wind power and photovoltaic power generation via measured DC voltage and DC current; AC voltage is checked to determine whether AC voltage of the power grid is in a normal condition, and when a failure is detected, the controller 1 controls the H bridge inverter unit 3 to output a corresponding AC voltage difference, and controls the grid-connected inverter 11 to inject wind power and photovoltaic power into the power grid.

The specific steps are as follows:

1) The controller 1 measures an AC supply voltage $U_S$, a DC output voltage $U_w$ and a DC output current $I_w$ of the rectifier unit 2, a DC voltage $U_{PV}$ and a DC current $I_{PV}$ of the DC voltage boost unit 8, and a rotational speed and a rotator angle of the synchronous generator;

2) Computing an output active power $P_w$: $P_w = U_w \times I_w$ of the rectifier unit 2;

3) Computing an output active power $P_{PV}$: $P_{PV}=U_{PV} \times I_{PV}$ of the DC voltage boost unit 8;

4) The controller 1 controls complimentary wind, photovoltaic and electric compensation output of the rectifier unit 2 and the DC voltage boost unit 8:

tracking maximum power of wind-power: checking a current value of the output active power $P_w$ of the rectifier unit, increasing the rotational speed of the synchronous generator if the current value of the output active power $P_w$ of the rectifier unit is greater than a previous value of $P_w$, and otherwise maintaining the rotational speed of the synchronous generator unchanged;

tracking maximum power of photovoltaic power: checking a current value of the output active power $P_{PV}$, increasing a duty cycle if the current value of the output active power $P_{PV}$ is greater than a previous value of $P_{PV}$, and otherwise maintaining the duty cycle unchanged;

5) Let $U_{S0}$ be an AC supply voltage value in a normal condition of the power grid, and $U_{S1}$ be an AC supply voltage value when the power grid in a failure state: if the power grid is in the normal condition, that is, the AC supply voltage $U_S$ is equal to or greater than 90% of the AC supply voltage value $U_{S0}$ in the normal condition, controlling an output voltage of the H bridge inverter unit 3 to be zero, so that the voltage injected into the supply AC transmission line is zero, and control the grid-connected inverter 11 to supply and back-feed wind power and photovoltaic power to the power grid;

if the power grid is in a failure state, that is, the AC supply voltage $U_S$ is less than 90% of the AC supply voltage value $U_{S0}$ in the normal condition, controlling the H bridge inverter unit 3, so that the output voltage of the H bridge inverter unit 4 satisfies: $U_j=(U_{S0}-U_S)$, and controlling the grid-connected inverter 11 to supply an extra wind power and photovoltaic power to the power grid, and if the wind power and photovoltaic power is not sufficient, supplying power to the DC bus via the grid-connected inverter for maintaining the voltage of the DC bus to be stable.

While the disclosure has been described and illustrated with reference to the preferred embodiments, one of ordinary skill in the art should understand that the disclosure is not limited to the embodiments described above, the form and detail can be changed variously within the scope of the claims.

We claim:

1. A feedforward voltage series compensator, comprising
a controller having a rectification control terminal, an H bridge inverter control terminal, a DC voltage boost control terminal, an input terminal for input signals of rotational speed and rotor angle, a PV DC voltage input terminal, a PV DC current input terminal, a grid-connected inverter control terminal, a wind-power DC voltage input terminal, a wind-power DC current input terminal, and an AC voltage input terminal, a rectifier unit having a control terminal, an AC input terminal, and a DC output terminal, an H bridge inverter unit having a control terminal, a DC bus terminal, and an AC output terminal, a series transformer having a primary coil with two ends and a secondary coil, a wind-power DC voltage sensor having an input terminal and an output terminal, a wind-power DC current sensor having an input terminal and an output terminal, an AC voltage transducer having an input terminal and an output terminal, a DC voltage boost unit having a control terminal, a DC input terminal, and a DC output terminal, a PV DC voltage sensor having an output terminal and an input terminal, a PV DC current sensor having an output terminal and an input terminal, and a grid-connected inverter having a control terminal, a DC bus terminal, and an AC output terminal, wherein the rectification control terminal of the controller is connected with the control terminal of the corresponding rectifier unit, the H bridge inverter control terminal of the controller is connected with the control terminal of the corresponding H bridge inverter unit, the DC voltage boost control terminal of the controller is connected with the control terminal of the corresponding DC voltage boost unit, the input terminal for input signals of rotational speed and rotor angle of the controller is connected with an output terminal of the rotor position encoder of a wind power synchronous generator, the PV DC voltage input terminal of the controller is connected with the output terminal of the PV DC voltage sensor, the PV DC current input terminal of the controller is connected with the output terminal of the PV DC current sensor, the grid-connected inverter control terminal of the controller is connected with the control terminal of the grid-connected inverter, the AC input terminal of the rectifier unit is connected with an output terminal of a wind power synchronous generator stator, the DC output terminal of the rectifier unit is connected with a DC output terminal of the DC voltage boost unit, and subsequent to connection with the DC output terminal of the DC voltage boost unit, is connected with the DC bus terminal of the H bridge inverter unit, the AC output terminal of the H bridge inverter unit is connected with the two ends of the primary coil of the series transformer, the secondary coil of the series transformer is connected in series to a transmission line of a power grid, and is respectively connected with a supply terminal and a load terminal of the power grid, the input terminal of the wind-power DC voltage sensor is connected with the DC output terminal of the rectifier unit, the output terminal of the wind-power DC voltage sensor is connected with the wind-power DC voltage input terminal of the corresponding controller, the input terminal of the wind-power DC current sensor is connected with the DC output terminal of the rectifier unit, the output terminal of the wind-power DC current sensor is connected with the wind-power DC current input terminal of the corresponding controller, the input terminal of the AC voltage transducer is voltage connected with a node of the power grid, the output terminal of the AC voltage transducer is connected with the AC voltage input terminal of the controller, the DC input terminal of the DC voltage boost unit is connected with an output terminal of a PV cell panel;

the input terminal of the PV DC voltage sensor is connected with the DC output terminal of the DC voltage boost unit, the output terminal of the PV DC voltage sensor is connected with the PV DC voltage input terminal of the corresponding controller, the input terminal of the PV DC current sensor is connected in series with the DC output terminal of the DC voltage boost unit, the output terminal of the PV DC current sensor is connected with the PV DC current input terminal of the corresponding controller, the DC bus terminal of the grid-connected inverter is connected with the DC bus terminal of the H bridge inverter unit, the AC output terminal of the grid-connected inverter is voltage parallel connected with the node of the power grid, and the control terminal of the grid-connected inverter is connected with the grid-connected inverter control terminal of the corresponding controller.

2. The feedforward voltage series compensator according to claim 1, further comprising central processing units, the central processing units having core parts being digital signal processors, MCUs, or computers, wherein the controller is implemented via the central processing units.

3. A method for series compensation employing the feedforward voltage series compensator of claim 1, comprising measuring, by the controller, an AC supply voltage $U_S$, a DC output voltage $U_w$ and a DC output current $I_w$ of the rectifier unit, a DC voltage $U_{PV}$ and a DC current $I_{PV}$ of the DC voltage boost unit, and the rotational speed and the rotor angle of the synchronous generator;

computing an output active power $P_w$: $P_w = U_w \times I_w$ of the rectifier unit;

computing an output active power $P_{PV}$: $P_{PV} = U_{PV} \times I_{PV}$ of the DC voltage boost unit;

controlling, by the controller, complimentary wind, photovoltaic, and electric compensation output for the rectifier unit and the DC voltage boost unit, tracking maximum power of wind power, checking a current value of the output active power $P_w$ of the rectifier unit, increasing the rotational speed of the synchronous generator when the current value of the output active power $P_w$ of the rectifier unit is greater than a previous value of $P_w$, and otherwise maintaining the rotational speed of the synchronous generator unchanged;

tracking maximum power of photovoltaic power, checking a current value of the output active power $P_{PV}$, increasing a duty cycle when the current value of the output active power $P_{PV}$ is greater than a previous value of $P_{PV}$, and otherwise maintaining the duty cycle unchanged;

letting $U_{S0}$ be an AC supply voltage value in a normal condition:

when the power grid is in the normal condition, that is, the AC supply voltage $U_S$ is equal to or greater than 90% of the AC supply voltage value $U_{S0}$ in the normal condition, controlling an output voltage of the H bridge inverter unit to be zero, enabling a voltage of the series transformer going into a supply AC transmission line to be zero, and controlling the grid-connected inverter to supply and back-feed wind power and photovoltaic power to the power grid;

when the power grid is in a failure state, that is, the AC supply voltage $U_S$ is less than 90% of the AC supply voltage value $U_{S0}$ in the normal condition, controlling the H bridge inverter unit, so that the output voltage of the H bridge inverter unit satisfies: $U_j = (U_{S0} - U_S)$, and controlling the grid-connected inverter to supply an extra wind power and photovoltaic power to the power grid, and if the wind power and photovoltaic power is not sufficient, supplying power to the DC bus via the grid-connected inverter for maintaining the voltage of the DC bus to be stable.

* * * * *